(12) United States Patent
Kobler et al.

(10) Patent No.: US 11,136,006 B2
(45) Date of Patent: Oct. 5, 2021

(54) DEVICE FOR INFLATING A TIRE

(71) Applicant: SPORT COMPONENTS AG, Zürich (CH)

(72) Inventors: Pius Kobler, Zürich (CH); Dominik Eggert, Zürich (CH); Nico Spinelli, Zürich (CH); Arno Lenzi, Zürich (CH)

(73) Assignee: SPORT COMPONENTS AG, Zürich (CH)

( * ) Notice: Subject to any disclaimer, the term of this patent is extended or adjusted under 35 U.S.C. 154(b) by 0 days.

(21) Appl. No.: 16/736,560

(22) Filed: Jan. 7, 2020

(65) Prior Publication Data

US 2020/0148177 A1  May 14, 2020

Related U.S. Application Data

(63) Continuation-in-part of application No. 15/566,963, filed as application No. PCT/EP2016/058253 on Apr. 14, 2016, now abandoned.

(30) Foreign Application Priority Data

Apr. 17, 2015  (CH) .................................. 00537/15
Apr. 14, 2016  (WO) ................. PCT/EP2016/058253

(51) Int. Cl.
*F16L 37/40* (2006.01)
*B60S 5/04* (2006.01)

(52) U.S. Cl.
CPC ............... *B60S 5/043* (2013.01); *F16L 37/40* (2013.01)

(58) Field of Classification Search
CPC ......... B60C 29/06; B60C 29/068; B60S 5/04; B60S 5/043; F16L 37/32; F16L 37/35;
(Continued)

(56) References Cited

U.S. PATENT DOCUMENTS 1,099,713 A  *  6/1914  Morris ................... F16K 11/22
                                                137/883
2,928,448 A  ‡  3/1960  Hosking ................. B60C 29/02
                                                152/42

(Continued)

FOREIGN PATENT DOCUMENTS

CN       2366580 Y       3/2000
DE    30 05 599 A1       8/1981
(Continued)

*Primary Examiner* — Hailey K. Do
(74) *Attorney, Agent, or Firm* — Pauley Erickson & Swanson (57) ABSTRACT

The invention is directed to a device for inflating a tire that includes a housing with at least one first connection port and at least one second connection port. The second connection port includes connecting means to interconnect the device with a pressure tank. The first connection port is fluidically connected to the second connection port by means of a fluid passage. Furthermore the device comprises a first valve. When a pressure tank is connected to the second connection port and when the first valve is in a closed state, the first valve is suited to prevent air from flowing from inside of the pressure tank out of the first connection port. When the first valve is in an open state, it is suited to allow passage of air from inside of the pressure tank through the fluid passage to the first connection port. The device further includes a second valve that is connectable to an inflator for pressurizing the tank.

21 Claims, 6 Drawing Sheets

(58) Field of Classification Search
CPC . F16L 37/40; F16L 29/02; F16L 29/04; F16K 7/10; F16K 7/18; F16K 15/031; F16K 15/181; F16K 15/063; F16K 15/185; F16K 15/16; F16K 15/202; F16K 15/205; F16K 15/207; Y10T 137/3584; Y10T 137/3724; F04B 33/005; F17C 13/04; F17C 13/045; F17C 2205/0142; F17C 2205/0146; F17C 2205/0329; F17C 2205/0332; F17C 2205/0335; F17C 2221/013; F17C 2221/031; F17C 2223/0123; F17C 2223/0146; F17C 2223/0153; F17C 2225/0123; F17C 2250/0481; F17C 2270/0168; F17C 2270/0736; F17C 2270/0772

See application file for complete search history.

(56) References Cited

U.S. PATENT DOCUMENTS

| | | | | |
|---|---|---|---|---|
| 3,830,249 | A ‡ | 8/1974 | Fleenor | B60C 29/06 137/224 |
| 3,934,622 | A | 1/1976 | Vitack et al. | |
| 5,012,954 | A ‡ | 5/1991 | Will | B60C 23/10 141/33 |
| 5,590,696 | A ‡ | 1/1997 | Phillips | B60S 5/043 141/19 |
| 6,202,714 | B1 ‡ | 3/2001 | Wang | B60S 5/04 141/301 |
| 6,290,476 | B1 | 9/2001 | Wu | |
| 6,321,782 | B1 * | 11/2001 | Hollister | F17C 13/025 137/557 |
| 6,652,242 | B2 | 11/2003 | Wu | |
| 6,957,667 | B2 * | 10/2005 | Huang | F16K 11/205 137/881 |
| 8,414,277 | B1 ‡ | 4/2013 | Hollars | F04B 53/10 417/374 |
| 8,721,296 | B1 ‡ | 5/2014 | Wang | F04B 33/005 137/565.15 |
| 2003/0032507 | A1 ‡ | 2/2003 | Lacroix | A63B 41/00 473/59 |
| 2003/0192619 | A1 * | 10/2003 | Marui | F04B 41/02 141/40 |
| 2006/0021472 | A1 ‡ | 2/2006 | Ragan | B29C 73/166 81/15 |
| 2013/0019994 | A1 * | 1/2013 | Schaer | F17C 7/00 141/313 |
| 2013/0048578 | A1 ‡ | 2/2013 | Inskeep | C02F 1/002 210/808 |
| 2017/0057309 | A1 ‡ | 3/2017 | Kobler | B60C 29/062 |
| 2018/0126963 | A1 | 5/2018 | Kobler et al. | |

FOREIGN PATENT DOCUMENTS

| | | |
|---|---|---|
| DE | 3005599 A1 ‡ | 8/1981 |
| DE | 31 14 383 A1 | 10/1982 |
| DE | 31 14 383 A1- ‡ | 10/1982 |
| DE | 41 20 187 C1 | 9/1992 |
| DE | 41 20 187 C1- ‡ | 9/1992 |
| DE | 92 10 467 U1 | 10/1992 |
| DE | 92 10 467 U1- ‡ | 10/1992 |
| DE | 10 2012 101158 A1 | 3/2013 |
| DE | 10 2012 101158 A1- ‡ | 3/2013 |
| EP | 1 041 282 A2 | 10/2000 |
| EP | 1 041 282 A2- ‡ | 10/2000 |
| EP | 1 353 068 A2 | 10/2003 |
| EP | 1 353 068 A2- ‡ | 10/2003 |
| FR | 2 216 16 A1- ‡ | 8/1974 |
| FR | 2 216 516 A1 | 8/1974 |
| FR | 2 991 734 A1 | 12/2013 |
| FR | 2 991 734 A1- ‡ | 12/2013 |
| GB | 1 439 710 | 6/1976 |
| GB | 1 439 710- ‡ | 6/1976 |
| WO | WO 00/77429 A1 | 12/2000 |
| WO | WO 00/77429 A1- ‡ | 12/2000 |
| WO | WO 2010/009887 A1 | 1/2010 |
| WO | WO 2010/009887 A1- ‡ | 1/2010 |
| WO | WO 2015/124239 A1 | 8/2015 |
| WO | WO 2015/124239 A1- ‡ | 8/2015 |

\* cited by examiner
‡ imported from a related application

DEVICE FOR INFLATING A TIRE

CROSS REFERENCE TO RELATED APPLICATIONS

This application is a continuation-in-part of U.S. patent application Ser. No. 15/566,963, filed on 16 Oct. 2017, which is a 371 Application of PCT/EP2016/058253, filed 14 Apr. 2016, which is a continuation of Swiss Patent Application No. CH 00537/15, filed 17 Apr. 2015. The co-pending parent application is hereby incorporated by reference herein in its entirety and is made a part hereof, including but not limited to those portions which specifically appear hereinafter.

BACKGROUND OF THE INVENTION

Field of the Invention

The present invention is directed to a device for inflating a tire, such as a tire of a bicycle, in particular a tubeless tire.

Discussion of Related Art

Conventional bicycle tires comprise inner tubes which essentially are airtight torus-shaped balloons with a valve in order to be connected to an inflator.

Such inner tubes can in principle be inflated by almost any type of inflator, as long as the inflator allows generating a certain minimum air pressure. Accordingly, such conventional tires can e.g. be inflated by automatic air compressors or even relatively small hand air pumps. Although automatic air compressors will in most situations be preferred due to their operator convenience, small hand air pumps are widespread because they are portable and thus e.g. can also be used during cycling trips where no automatic air compressors are available.

In recent years tubeless tire systems for bicycles have emerged as an alternative to conventional tires with inner tubes. Tubeless tires allow for low tire pressure and hence can be used in order to increase traction on difficult terrain. Therefore they in particular became popular in mountain biking. In tubeless tires, pressurized air is not stored in an airtight inner tube anymore but directly in the inner air chamber defined by the tire and the rim. A major drawback of tubeless tires is that before inflation, the tire beads are just loosely mounted on the rim. In order to obtain a proper sealing between tire and rim, a minimum pressure gradient between a wheel's air chamber and the outside of the wheel (atmosphere) has to be established. This is only possible if for the initial inflation relatively high volumetric flow rates of air during a certain minimum time duration are applied. Hence a quasi-instantaneously sealing of the inner air chamber can be induced. This holds particularly true for mountain bike tires which—when compared to most other types of tires—have a relatively large inner air chamber volume. If the volumetric flow rates are too low or cannot be maintained during a certain minimum time duration, sealing between tire and rim cannot be obtained as the pressure gradient between inside and outside of the tire remains too low due to leakage between the tire and the rim. Consequently for the initial inflation of tubeless tires typically conventional air compressors are used, as they allow for constant high volumetric flow rates of air. Nevertheless, if such compressors are not available—as may be the case during bicycle trips in remote areas—the initial inflation of tubeless tires often turns out to be difficult, if not impossible. The same holds true for those cyclists who do not have access to air compressors at home.

From the prior art several systems for inflating tires are known. U.S. Pat. No. 5,012,954 was published on 7 May 1991 on behalf of Conrad A. Will and shows a system for inflating tire inner tubes. The disclosed system is directed to the inflation of bicycle tire inner tubes using a sealed cartridge that contains a requisite volume of pressurized gas to inflate a mounted tire inner tube. The invention is directed to offer a system to inflate tire inner tubes quicker, easier and more efficiently than with hand air pumps which are also available for this task.

EP 1 041 282 A2 was published on 4 Oct. 2000 on behalf of Barbieri S.n.c. di Barbieri Nadia e Kalman and discloses a carbon-dioxide pump for tires. The pump comprises a nosepiece for coupling the pump to the valve of a tire. The nosepiece is connected to a threaded hole for the hermetic fixing of a bottle that contains carbon dioxide. The bottle is sealed by a membrane that can be pierced by a needle-equipped pin, such that the content of the bottle is delivered to a tire. The pump comprises means in order to interrupt the flow of gas if needed. Furthermore, the pump comprises a mechanism which allows performing manual inflation of a tire. The pump disclosed comprises a handgrip which can be moved back and forth in order to pump air into the tire, similar to a conventional hand air pump.

EP 1 353 068 A2 (equivalent to US2003/0192619A1) was published on 15 Oct. 2003 on behalf of Marui Co. Ltd. Kobe-Shi and discloses an air pump for bicycles. The application is directed to provide an air pump for bicycles capable of swiftly charging a large amount of high-pressure air into a bicycle tire, such as a tubeless tire. Therefore the air pump comprises a storage tank for storing compressed air which is charged thereinto from a manual pump through a tank-charging passage. The pump further comprises an air discharge port which can be used to charge air into a bicycle tire. The air pump comprises a hand-operated three-way valve system which has to be switched between multiple positions related to different air-passages. The three-way valve system allows to establish an air-passage between the manual pump, the storing tank and the air discharge port for charging air from the manual pump into the storage tank, for discharging pressurized air into a bicycle tire from the air storage tank, for keeping the storage tank closed, and for refilling the bicycle tire from the manual pump when the storage tank is closed. In addition, a manual-pump check valve is arranged on the three-way valve system at the port towards the manual pump, and a storage-tank check valve is arranged at the storage tank to prevent outflow of air when the storage tank is detached from the three-way valve system. The serial arrangement of the three-way valve with the additional check valves improves safety, but decreases ease of operation. When compared to conventional air pumps, this pump has a relatively bulky design and only a limited portability. Furthermore, the disclosed bulky design makes it difficult to position the air pump between the spokes of a wheel. In addition, the whole air pump is relatively heavy when compared to conventional air pumps, which reduces the portability of such types of air pump systems even further. And on the other hand, the air pumps as disclosed in EP 1 353 068 A2 are relatively expensive as multiple valves are arranged in series and a special air storage tank is needed.

US2013/0048578A1 by M. Inskeep, published on 28 Feb. 2013, discloses a water bottle with removable top and disposable filter with integrated pressurized hand pump for water filtration and delivery to the user.

FR2216516 by Nippon Piston Ring Co., Ltd., published on 30 Aug. 1974, discloses a single-use pressure tank with a check valve for discharging pressurized gas, but without a second valve for refilling gas into the pressure tank.

DE3005599A1 by Walther, published on 20 Aug. 1981, discloses a compressed-air breathing device having a Y-shaped connector for connecting two compressed-air cylinders in parallel.

U.S. Pat. No. 8,721,296B1 by Wang, published on 13 May 2014, discloses a hand pump with air storage tank for inflating tires. An overpressure valve is arranged at the mouth piece of the air storage tank for releasing overpressure from the air storage tank. In addition, a relief valve is engaged into the casing for relieving pressurized air in a passage or channel of the casing when required.

SUMMARY OF THE INVENTION

Systems known from the prior art which may generate sufficient volumetric flow rates using sealed pressurized cartridges are relatively expensive and rely on a reliable supply of cartridges. Furthermore, the environmental impact of these systems is usually high, as most cartridges are made of metal and intended for single-use only. In addition, pressurized cartridges are prohibited from being brought onto airplanes and thus these systems are not suited for air travel. As well, the consumption of such cartridges becomes high as soon as tire pressure has to be altered repeatedly during bicycle trips in order to adjust it depending on terrain and speed.

Furthermore, some of the systems known from the prior art are relatively bulky and/or heavy. Cyclists therefore will usually refrain from carrying them on bicycle rides, as they mainly serve as backup systems for the unlikely event of total loss of air. As well, most of the inflator systems known from the prior art are relatively expensive as they are built up from a high number of components.

Furthermore, in many of the systems known from the prior art the fluid flow paths between pressurized tanks and outlet ports are winding with relatively small cross sectional areas. This causes high pressure drops along the flow path and consequently also decreases the volumetric flow rates. Hence, the pressure gradient between the pressurized tank and the tire has to be high in order to obtain sufficiently high and constant volumetric flow rates. This in particular holds true if small cartridges are used.

Therefore, one object of the present invention is to provide a device suited for inflating tubeless tires which avoids the problems known from the prior art. According to the present invention, as defined in the independent claims, devices for inflating tubeless tires can be established which are relatively low-priced, compact, lightweight and eco-friendly when compared to the systems known from the prior art.

In order to achieve the objects of the present invention, a device is provided which comprises a housing that comprises at least one first connection port that can be connected to a valve of a wheel. Such a connection port may be formed in various ways, as will be explained in further details below. As well, the housing of a device according to the invention comprises at least one second connection port which comprises connecting means that allow to interconnect the device with a pressure tank that can be filled with pressurized air. Within the context of the invention, "air" should be understood to include any gas or mixture of gases suited for inflating a tire. According to the invention, the at least one first connection port is fluidically connected to the at least one second connection port by means of a fluid passage. A device according to the invention furthermore comprises a first valve. When a pressure tank is connected to the at least one second connection port, the first valve in a closed state is suited to prevent air from flowing from inside of the pressure tank out of the at last one first connection port. When in an open state, the first valve is suited to allow passage of air from inside of the pressure tank through the fluid passage to the at least one first connection port.

The at least one first connection port may be formed as an opening encircled by a sealing element, which may be an elastic material such as a rubber. Hence a particularly airtight connection between the device and a tire valve of a wheel may be obtained which may help to prevent loss of air during an inflation process, as will be explained in further details below.

Alternatively or in addition, the first connection port may also comprise a flange or sleeve (respectively collar) into which the tire valve (respectively valve stem of a wheel) may be at least partially inserted. Thus the airtightness of the connection between the device and the tire valve can be increased. Particularly good results may be obtained if the flange or sleeve comprises a sealing element arranged at the flange or sleeve such that it prevents (or at least decreases) airflow between the outer surface of the tire valve and the inner surface of the flange or sleeve. The sealing element may e.g. comprise an elastic plastic member, such as a sealing ring. The sealing element may also comprise an annular restriction in the opening of the flange or sleeve.

The first connection port may be formed such that it can be connected directly to a tire valve. Alternatively or in addition an adapter may be used in order to establish a connection between the device and a tire valve. Such an adapter may e.g. be screwed to the valve of the wheel and establish a proper connection with the device. In a variation of the invention, multiple different adapters may be applied in order to use the device in combination with multiple different types of tire valves.

In order to obtain a highly versatile device, the device may comprise multiple first connection ports having different dimensions. Hence the same device may be used for different types of tire valves and thus the variety of device types can be decreased.

Devices according to the invention are advantageous as they allow converting various types of tanks into pressure tanks. Hence, in contrast to the inflators known from the prior art, no purpose-built pressure tanks are needed and instead of that readily available multi-purpose tanks may be applied, as will be explained in further details below. Thus the environmental impact can be reduced, as well as the device may be sold separately from a pressure tank, which decreases packaging size of the device and increases portability.

For some applications, the first valve of the device may be a stopcock. Thus e.g. the pressure tank may be pressurized by fluidically connecting an inflator (e.g. an air pump) to the at least one first connection port and pumping air into the pressure tank, the stopcock being in an open state.

A particularly user-friendly device may be obtained if the first valve is a check valve, in particular if it is a flap valve. A flap valve e.g. may be arranged such that it switches from the closed state to the open state when a valve of a tire to be inflated is interconnected with the first connection port, as will be explained in further detail below. The flap valve may close at least one first connection port.

Alternatively, the at least one first connection port may comprise a sleeve and the check valve may comprise a valve body which has an elongated member. An elongated member may e.g. comprise a tube (pipe). The elongated member may be at least partially arranged inside of the sleeve when the check valve is in the closed state. The valve body may further comprise a sealing member which in the closed state is in sealing contact with the housing, thereby preventing air from flowing from inside of the pressure tank (or pressure tanks) out of the at least one first connection port. In order the inflate a tire, the elongated member may be arranged displaceable inside of the sleeve in a first axial direction of the sleeve such that when a valve of a tire to be inflated is interconnected with the first connection port the elongated member is displaced in the first axial direction and thereby moves the sealing member away from the housing allowing passage of air from inside of the pressure tank through the fluid passage to the at least one first connection port.

Good results may be obtained if the elongated member is formed as a tube having a peripheral wall and comprising at least one center opening and comprising at least one orifice that protrudes the tube wall in (essentially) radial direction. In particular, the center opening may be a blind hole extending in axial direction of the elongated member. The orifice may e.g. be a cross-hole that protrudes the center hole. Alternatively, the elongated member may also be essentially shaped like a (tuning) fork.

In order to make pressurizing of a pressure tank connected to the device more convenient, the device may comprise a return spring that applies a force on the valve body such that when no tire valve is interconnected with the first connection port that sealing member is pressed against the housing with a certain force, ensuring a closed state of the first valve.

In the invention, the device further comprises a second valve that is connectable to an inflator and can be used in order to pressurize the pressure tank with air. Good results may be obtained if the second valve is a standardized tire valve, such as a Schrader, Presto, Dunlop or any other type of valve. By using a standardized valve as a second valve, most conventional air pumps can be interconnected to the device and hence be used in order to pressurize a pressure tank connected to the device.

Depending on the application, the second valve may also serve as a pressure relief valve which limits the pressure that can be applied to the pressure tank and hence prevents supercritical pressurization of the device, respectively of a tank connected to it. A device with such a safety pressure relive valve may e.g. be advantageous if the device is used in combination with certain types of pressure tanks which are sensitive to overpressure and/or do not comprise pressure relief means themselves.

Alternatively or in addition the device may comprises a third valve arranged such that it releases pressurized air from inside of a pressure tank interconnected to the device if the pressure difference between inside of the pressure tank and outside exceeds a specific value, as will be explained in more detail below.

Such a specific value may be chosen such that a tire interconnected with the device can be properly inflated. As well, the specific value may be chosen such that a supercritical loading of the device and/or pressure tank can be avoided.

In a variation of the invention, the device may comprise multiple second connection ports in order to increase the total volume of pressurized air. A relatively big total tank volume with still a particularly ergonomic handling may be obtained with a variation of the device which comprises two second connection ports that both can be connected to a pressure tank. However also further second connection ports may be provided in order to further increase the volume of the pressure tank.

In a variation of the invention the device may also comprise at least one closure to close at least one second connection port and/or at least one first connection port. Such closures may e.g. be used in order to close second connection ports that are not interconnected with pressure tanks, e.g. if only a single pressure tank is applied. Alternatively or in addition closures may be used to obtain a closed container which may be used in order to store goods (such as adapters or tools) when the device is not used.

Alternatively or in addition, the device may comprise an adapter member that can be connected to at least one second connection port in order to interconnect the at least one second connection port with two or more third connection ports, each suited to be interconnected with a pressure tank. Thus, the number of pressure tanks to be interconnected with the device can be increased and consequently also the total volume of pressurized air. However, such an adapter—or a set of multiple varying adapters—may also be used in order to interconnect the device to varying types of pressure tanks.

Good results may be obtained if the connecting means of the at least one second connection port comprises a thread which engages with a mating thread arranged at the pressure tank to be interconnected with the device. Using a thread allows to establish fast and reliable connections.

In a variation of the device according to the present invention, at least one second connection port is designed to be interconnected with a plastic bottle, as e.g. a plastic drinking bottle. Hence the connecting means may correspond to an outer thread of a plastic drinking bottle. Good results may be obtained if the thread is a standard bottle thread, such as a type PCO 21 thread. Using standard threads allows to obtain a highly versatile device that can be combined with various plastic drinking bottles. However, the thread may also be another type of thread—which may be chosen from the group of the most common types of threads used for bottles or other containers in the geographic region where the device is intended to be used.

Using plastic drinking bottles as pressure tanks is particularly advantageous as they are nowadays widespread and therefore readily available. In addition, such bottles are often used by cyclists for water supply and hence may be present during bicycle trips anyway. As well, in many countries appropriate recycling systems are available for the most common types of plastic dinking bottles, such as bottles made from polyethylene terephthalate (PET). Hence, using plastic drinking bottles made from PET is much more environmentally friendly than e.g. using sealed cartridges containing pressurized air, which are known form the prior art and are usually made from metals. By using two plastic drinking bottles, each one having a content of up to e.g. 1.5 or 2 liters, a relatively big pressure tank can be obtained, which allows to operate at low pressure when compared to the small cartridges mentioned above.

Another advantage of such a variation of the invention is that many of the commonly used types of plastic drinking bottles have closures which are designed such that pressure is drained at the thread as soon as a specified threshold value of inner pressure is reached. Hence in such a variation of the invention the connecting means acts as a pressure relief valve. As a result, failure of the device and/or pressure tank due to overpressure can be prevented. Hence the abovementioned connecting means may be used alternatively or in addition to a separate safety pressure relief valve in order to increase user safety.

Good results may be achieved if the device or part of it has an elongated shape, hence if the housing or part of the housing e.g. essentially has the shape of an elongated cylinder or an elongated pyramid or an elongated cube or an elongated frustum or an elongated cone. Such an elongated shape allows for better access to tire valves which are usually positioned in between or at least close to spokes of the wheels. Compared to some of the relatively bulky inflators known from the prior art, such a variation of the invention has a significantly increased operator convenience. A housing which is shaped like a pyramid, cone, frustum or similar narrowing geometry is not only advantageous with respect to operator convenience, but also to production, as such housings can e.g. be produced by injection molding using relatively simple forming tools.

Particularly good results may be obtained if the cross section of the fluid passage essentially remains constant between the at least one second connection port and the region at the first connection port. Thus a smooth fluid flow path can be achieved which allows for maximum volumetric flow rates from an interconnected pressure tank to the first connection port.

In order to minimize the pressure drop between the inner side of a pressure tank that is interconnected with the device and the first connection port, the wall thickness of the housing may be relatively low if compared to the inflators known from the prior art and hence the fluid passage be designed to have a relatively large cross sectional area. Particularly good results may be obtained if the cross sectional area of the device's fluid passage essentially aligns with the cross sectional area of the pressure tank in the region of at least one second connection port. Thus, very smooth fluid flow paths can be obtained and the pressure drop be minimized.

In a variation of the device, the device may essentially be shaped like the letter "Y"—respectively have a forked shape. In such a variation, two second connecting ports may be arranged at the tips of each of the arms of the "Y" and at least one first connection port may be arranged at the long stem of the "Y", as will be explained in further details below. In one variation of the device, the shape of the device may be essentially symmetrical, as a capital letter "Y". In another variation, the device may have an asymmetrical shape, like the minor letter "y" according to typeset Calibri. Such forked shapes allow a particularly ergonomic handling of the device, even if it is interconnected with multiple pressure tanks. This particularly holds true if plastic drinking bottles are used as tanks, as these usually have ergonomic grips which can be used in order to hold the inflator assembly. In addition, such forked designs allow to obtain a smooth fluid flow path from both pressure tanks to the first connection port which results in high volumetric flow rates of air—even at low pressure gradients between the pressure tank and the atmosphere. Following this concept of smooth fluid flow paths, also variations of the device comprising three or more arms are possible.

In a variation of the present invention the device comprises means in order to connect it to a pressure tank made from a highly elastic material. Such a tank may be a rubber balloon or a balloon made from a similar resilient material. Hence, depending on the material used and thickness of its wall, such pressure tanks may allow to generate high volumetric flow rates while still having relatively compact dimensions when not being inflated. In a variation, a pressure tank may be an inner tube of a tire.

A device according to the invention may be made from a metal or a plastic material or any other material. Low-priced devices may be produced using injection molding of plastics. Good results may be obtained if multi-component, in particular two-component, injection molding is used, as such production methods e.g. allow forming sealing elements made from highly elastic materials.

The invention is also directed to an inflator assembly which comprises a device as described herein and at least one pressure tank that is connected to at least one second connection port of said device.

The device (respectively inflator assembly) according to the present invention is not limited to be used for bicycle wheels, but may also be used for other types of wheels, such as of scooters, motorbikes and others.

Good results may be obtained if the device (respectively inflator assembly) according to the present invention is used in combination with tire valves as described in a pending international patent application (PCT/EP2014/078579, entitled "Valve stem system, device and method to test and refill a tubeless tire-sealant", filed on 18 Dec. 2014). Such a combination is highly advantageous as it allows constant high volumetric flow rates while inflating the tire and prevents escape of air from the tire once the device is separated from the tire valve again.

In another first aspect, which is combinable with the embodiments disclosed herein, the invention is directed to:

A device for inflating a tire, comprising:
a. a housing, said housing comprising
  i. at least one first connection port,
  ii. at least one second connection port, each of said at least one second connection port comprising connecting means to interconnect the device with a pressure tank,
  iii. the at least one first connection port being fluidically connected to the at least one second connection port by a fluid passage;
b. a first valve;
c. when at least one pressure tank is connected, respectively, to at least one respective second connection port,
  i. the first valve (5) in a closed state is suited to prevent air from flowing from inside of the at least one pressure tank out of the at least one first connection port, and
  ii. the first valve in an open state is suited to allow passage of air from inside of the at least one pressure tank through the fluid passage to the at least one first connection port; and
d. a second valve that is connectable to an inflator and can be used in order to pressurize the at least one pressure tank, when it is connected to the device (1), with air,
e. the first valve is a two-way valve that is arranged in the device to close or open a fluidical connection through the at least one first connection port,
f. the second valve (9) is a two-way valve that is arranged in the device to close or open a fluidical connection through at least one third connection port, and
g. wherein the first valve can close or open a fluidical connection, e.g. a first fluidical connection, through the device between the at least one pressure tank, when connected to its respective second connection port, and an inner chamber of a tire, when connected to one first connection port; and, in particular, can cause transfer of gas from inside of the at least one pressure tank into the inner chamber of the tire when the second valve is closed, and
h. wherein the second valve can close or open a fluidical connection, e.g. a second fluidical connection, through the device between the inflator, when connected to the second valve, and the at least one pressure tank, when connected to its respective second connection port; and, in particular, can cause transfer of gas from the inflator to inside of the at least one pressure tank when the first valve is closed.

Feature g. in other words means that when the first valve opens, the device provides a fluidical connection between the at least one pressure tank, when connected to its respective second connection port, and an inner chamber of a tire, when connected to one first connection port, and can cause transfer of gas from inside of the at least one pressure tank into the inner chamber of the tire.

Or yet in other words, when the first valve opens, a pressure gradient between an inner space of the device and an inner chamber of the tire causes transfer of gas from inside of the at least one pressure tank (8, 8', 8") into the inner chamber of the tire.

In embodiments of feature g, manipulating solely the first valve is sufficient to close or open a fluidical connection between the pressure tank, when connected to the device, and an inner chamber of a tire, when connected to the device, thereby inflating the tire and equalizing the pressure in the pressure tank and the tire.

In embodiments, the device does not comprise besides the first valve any further valve that is arranged in the fluid passage between the at least one second connection port and the at least one first connection port.

In embodiments of the device, the first valve is allows a first flow through the device from the second connection port to the first connection port independently from the second valve allowing a second flow through the device from the third connection port to the first connection port.

In embodiments of the device, the first valve and the second valve function as the valves that close the pressure tank when being connected to the device; and/or the device does not comprise a three-way valve; and/or the device does not comprise any valve arranged at the second connection port.

In embodiments of the device, when the second valve is connected to the inflator and the pressure tank is connected to the at least one second connection port, the second valve is the sole valve arranged between the inflator and the pressure tank that can close or open a fluidical connection therebetween; and/or when the second valve is connected to the inflator and the tire is connected to the first connection port, the second valve is arranged in series with the first valve between the inflator and the tire.

In another second aspect, which is combinable with the embodiments disclosed herein, the invention is directed to:

A device for inflating a tire, comprising:
  a. a housing, said housing comprising
    i. at least one first connection port,
    ii. at least one second connection port, each of said at least one second connection port comprising connecting means to interconnect the device with a pressure tank,
    iii. the at least one first connection port being fluidically connected to the at least one second connection port by a fluid passage;
  b. a first valve;
  c. when at least one pressure tank is connected, respectively, to at least one respective second connection port,
    i. the first valve in a closed state is suited to prevent air from flowing from inside of the at least one pressure tank out of the at least one first connection port, and
    ii. the first valve in an open state is suited to allow passage of air from inside of the at least one pressure tank through the fluid passage to the at least one first connection port; and
  d. a second valve that is connectable to an inflator and can be used in order to pressurize the at least one pressure tank, when it is connected to the device (1), with air,
  e. wherein the first valve is a two-way valve that is arranged in the device to close or open a fluidical connection through the at least one first connection port, and
  f. the second valve is a two-way valve that is arranged in the device to close or open a fluidical connection through the at least one third connection port, and
  g'. wherein the first valve can close or open a fluidical connection through the device between the at least one second connection port and the at least one first connection port through the fluid passage without any further valve being present between the at least one first connection port and the at least one second connection port.

In embodiments of the device, the second valve is mounted on the third connection port of the device such that
  k'. a fluidical connection is provided through the device to the at least one second connection port without any further valve besides the second valve being present between the third connection port and the at least one second connection port; or
  l'. a fluidical connection is provided through the device to the at least one first connection port by the second valve being arranged in series with the first valve between the third connection port and the at least one first connection port.

In embodiments of the device, the device comprises exactly one first connection port and the first valve (5) is arranged at the first connection port; and/or the device comprises exactly one second connection port; and/or the device comprises exactly one third connection port.

In embodiments of the device of the further first or second aspect, the first connection port is formed such that it can be connected directly to a tire valve, or the device is configured such that an adapter is used to establish a connection between the device and a tire valve; and/or the second valve is a standardized tire valve.

In embodiments of the device of the further first or second aspect, the device has a compact design with dimensions comparable to or smaller than a hand of a grown-up person.

In embodiments of the device of the further first or second aspect, the device is suitable or is used or is designed as a closure of a portable pressure tank, such as a plastic drinking bottle, wherein the first valve and the second valve are closeable or closed for sealing the pressure tank during transportation.

In embodiments of the device of the further first or second aspect, the device comprises a third valve arranged such that it serves as a pressure gauge, which indicates when an inflator assembly, comprising the device and a pressure tank connected to the at least one second connection port, is sufficiently pressurized for being connected to a tire valve.

In another third aspect, which is combinable with the embodiments disclosed herein, the invention is directed to:
An inflator assembly comprising
  a. a device according the other first or second aspect of the invention; and
  b. at least one pressure tank that is connected to at least one second connection port of the device.

In embodiments of the inflator assembly of the further third aspect, the pressure tank is a multi-purpose pressure tank, such as a plastic bottle or preferably plastic drinking bottle; or the pressure tank is made from a highly elastic material, such as a rubber balloon or a balloon made from a similar resilient material, or is an inner tube of a tire.

In embodiments of the inflator assembly of the further third aspect, exactly one pressure tank is connected or is connectable to the device.

In another fourth aspect, which is combinable with the embodiments disclosed herein, the invention is directed to:

A system comprising
A. an inflator assembly comprising
   a. a device according to the other first or second aspect;
   b. the at least one pressure tank being connected to at least one corresponding second connection port of the device, and
B. a tire that is connected to one first connection port,
C. wherein, when the first valve opens, a pressure gradient between an inner space of the inflator assembly and an inner chamber of the tire causes transfer of gas from inside of the at least one pressure tank into the inner chamber of the tire.

In embodiments of the system of the further fourth aspect, exactly one pressure tank is connected or is connectable to the device; and/or exactly one tire is connected or is connectable to the device; and/or exactly one inflator is connected or is connectable to the device.

BRIEF DESCRIPTION OF SEVERAL VIEWS OF THE DRAWINGS

The herein described invention will be more fully understood from the detailed description of the given herein below and the accompanying drawings, which should not be considered limiting to the invention described in the appended claims.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
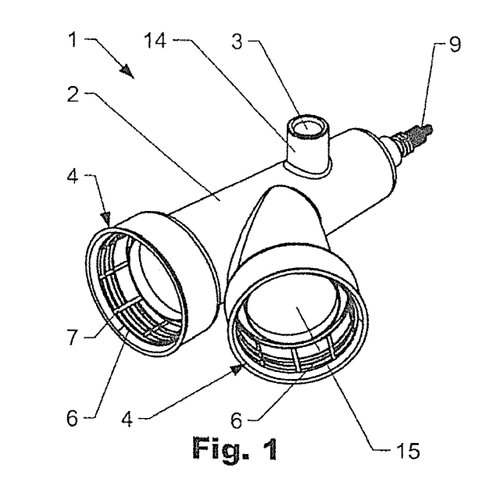
FIG. 1 schematically shows a device in a perspective view.
Figure 2:
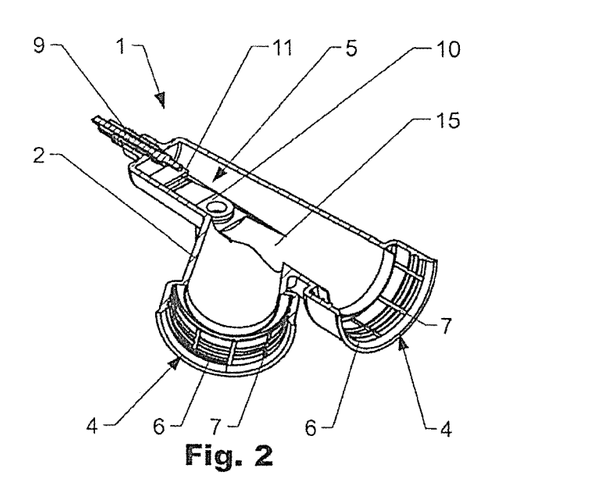
FIG. 2 schematically shows a device in a perspective view, the housing of the device partially being clipped for illustrative purposes.

FIGS. 1 and 2 schematically show an embodiment of a device 1. The device 1 comprises a housing 2 with a first connection port 3 and two second connection ports 4. The first connection port 3 is formed as a sleeve 14 with an axial opening that is arranged in order to receive the stem valve of a wheel (not shown). The two second connection ports 4 further comprise inner threads 6 which are arranged in order to engage with an outer thread of tanks (not shown in FIG. 1) to be connected to the device 1. The threads 6 comprise venting recesses 7 as are e.g. known from the caps used for plastic drinking bottles. As can be seen, the device 1 has a forked shape, similar to the shape of the minor letter "y" according to typeset Calibri. Both arms as well as the long stem having a narrowing profile like a frustum, which allows easy demolding/ejection if the device is produced by injection molding.

FIG. 2 shows the device of FIG. 1, part of the housing being removed from illustrative purposes. As can be seen, the device comprises an inner valve 10 which in this case is a check valve embodied as flap valve, which in a closed state (as shown) seals the first connection port 3. In order to minimize the pressure drop between the inner side of tanks connected to the second connection ports 4 and the first connection port 3 and also to obtain smooth fluid flow paths, the wall thickness of the housing 2 is relatively low if compared to the inflators known from the prior art and hence the device 1 has a relatively large inner void space that is used as fluid passage 15. If the device 1 is interconnected with plastic drinking bottles, the cross sectional area of the inner space essentially aligns with the cross sectional area of the bottleneck.

Figure 3:
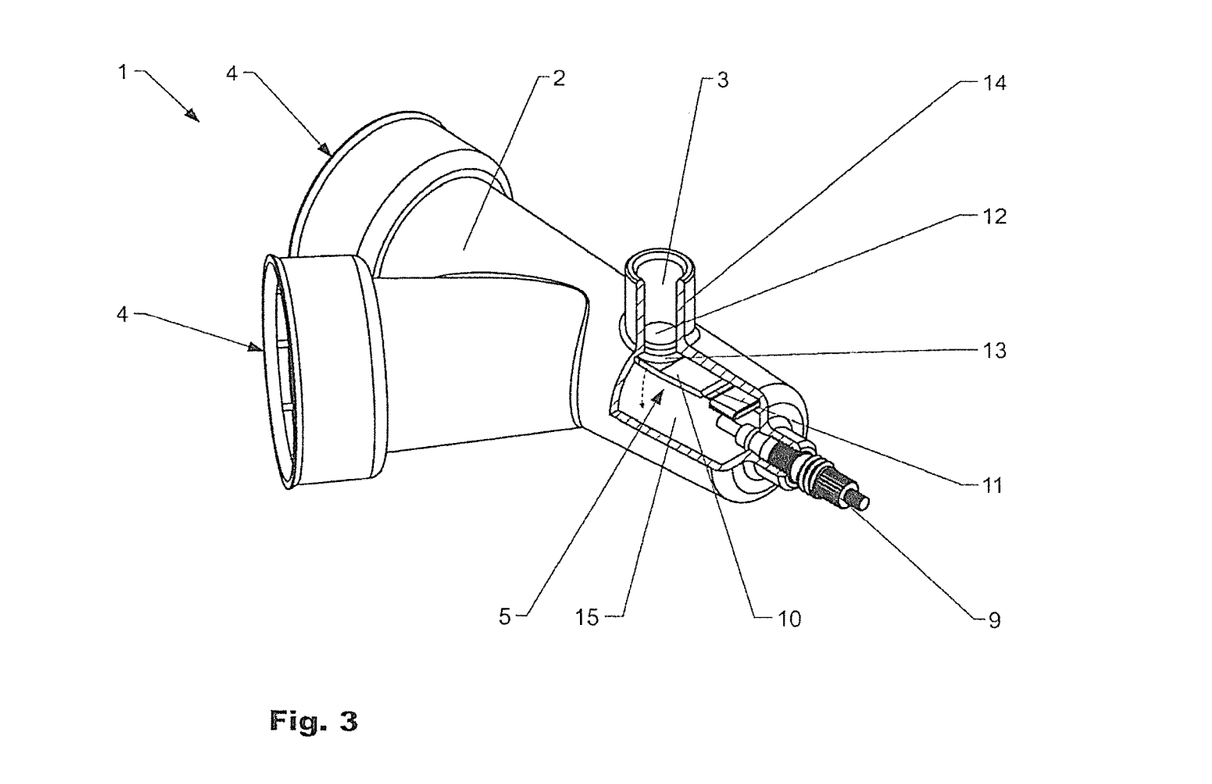
FIG. 3 schematically shows a device in a perspective view, the housing of the device partially being clipped for illustrative purposes.

FIG. 3 shows the device of FIGS. 1 and 2 in a perspective view. Part of the housing 2 has been clipped for illustrative purposes in order to show the region of the first connection port 3. As shown, the first connection port 3 comprises a sleeve 14 which is arranged to receive the valve of a wheel, as will be shown in further detail below. At the first connection port 3, a first valve 5 is arranged. In the embodiment shown, said first valve 5 is a flap valve comprising a flap 10 and a hinge 11, which is a film hinge. The flap 10 can pivot about the hinge 11 between a closed and an open state (indicated by a dotted arrow). In a closed state the first valve 5 prevents air from flowing from the fluid passage 15 of the device 1 through the sleeve 14 (respectively the first connection port 3) outside. The hinge 11 is formed such that the first valve 5 by default is in the closed state. The flap 10 comprises a plug-shaped element 12 which in the closed state of the flap valve is arranged in the first connection port 3 (respectively the sleeve 14). In order to allow an airtight sealing when the first valve 5 is in a closed state, the flap 10 comprises a sealing ring 13 which is arranged on the plug 12 and ensures proper sealing between the flap 10 and the housing 2. The flap 10 is positioned within the housing 2 such that it is reachable from outside by a finger or a pencil or similar elongate tool in order to bring the first valve 10 manually into a closed state if needed. As also shown in FIG. 3, the variation of a device 1 as shown in the figures comprises a second valve 9 which is a valve known from bicycles. This pressurizing second valve 9 can be connected to a standard air pump in order to pressurize an air tank connected to the device 1, as will be shown in further details below.

Figure 4:
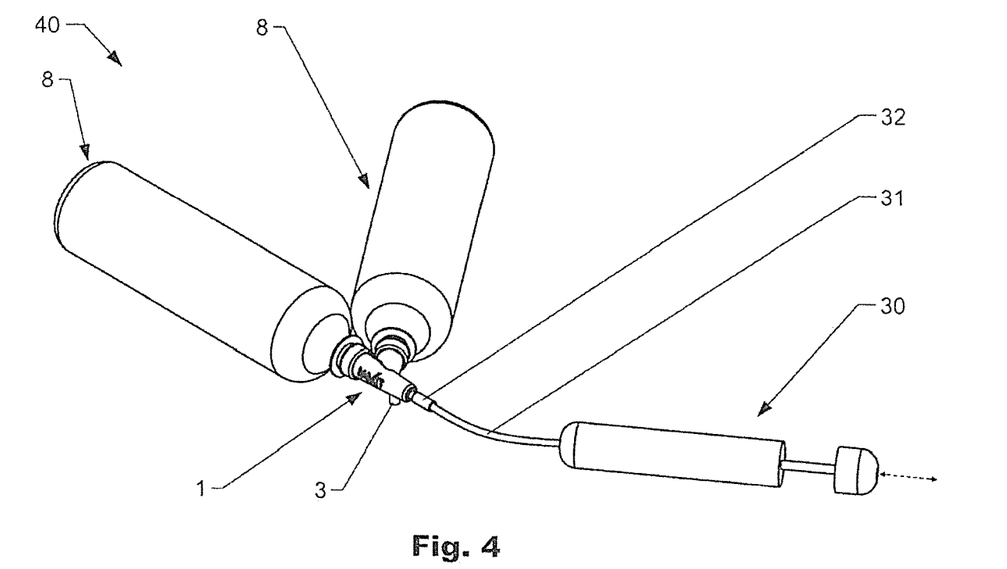
FIG. 4 schematically shows a device with connected tanks, and an air pump connected to the device.

FIG. 4 shows an inflator assembly 40 in order to inflate a tire when being pressurized by an air pump 30. In order to create a pressure tank with a sufficient volume, two individual pressure tanks 8 have been interconnected with the device 1. In the assembly shown, the pressure tanks 8 are plastic drinking bottles. The two plastic drinking bottles 8 are interconnected with the device 1 by means of the outer thread which usually serves to engage with the inner thread of a cap. The two plastic drinking bottles 8 are screwed in the two second connection ports 4, the outer threads of the plastic drinking bottles 8 engaged with the inner threads 6 of the device 1.

As can also be seen in all figures, the two second connection ports 4 are arranged with respect to each other at an angle, which on the one hand allows to connect two relatively large tanks 8 without colliding with each other. On the other hand, such an arrangement allows connecting the device 1 to a wheel, without colliding with the spokes or disk of the wheel, as shown in subsequent FIGS. 5 to 7.

Figure 5:
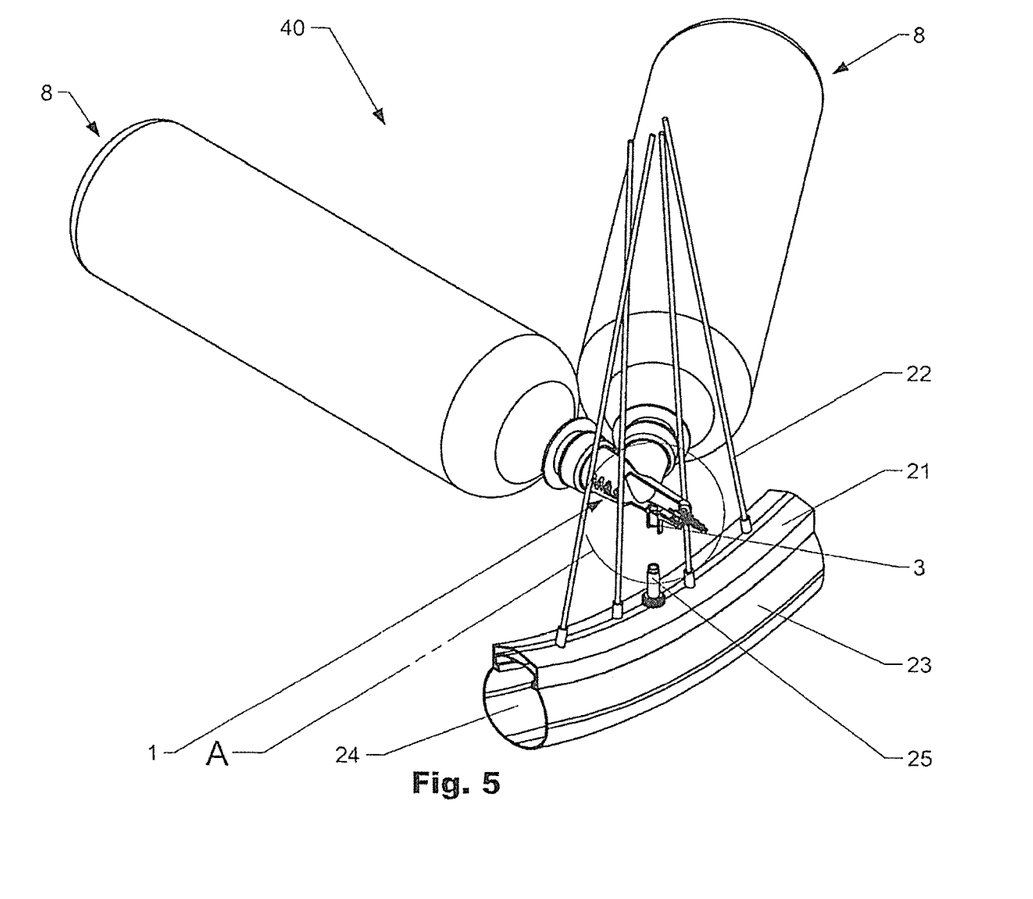
FIG. 5 schematically shows an inflator assembly comprising a device and two connected tanks, the assembly being arranged to be connected to the valve of a wheel.
Figure 6:
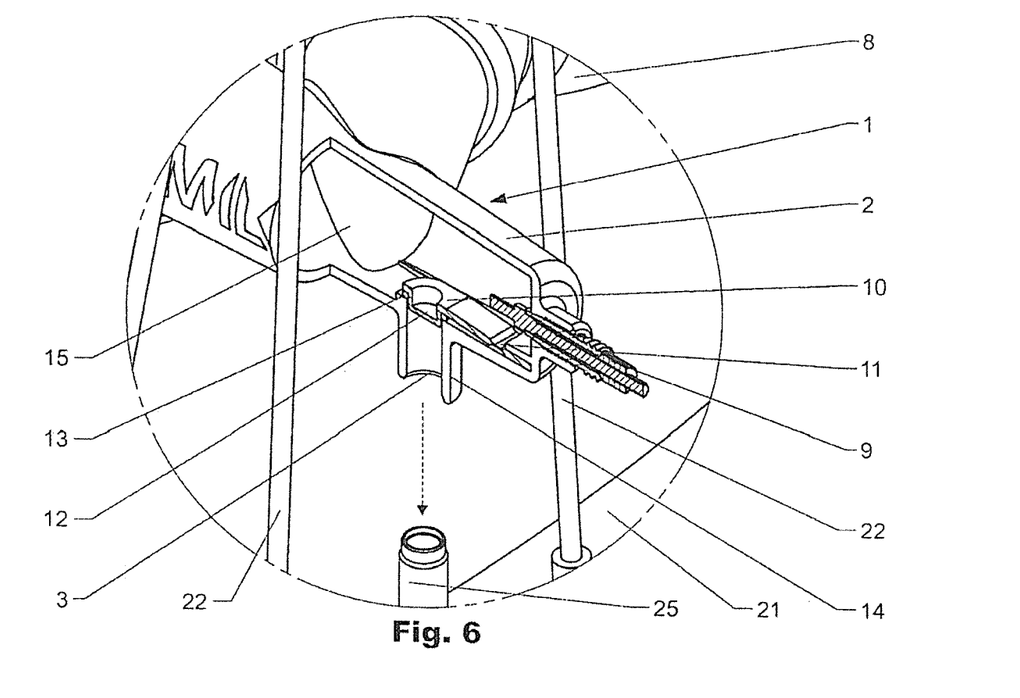
FIG. 6 shows detail A of FIG. 5.

FIG. 6 shows detail A of FIG. 5, where the inflator assembly 40 is pressurized and arranged partially in between the spokes and the sleeve 14 of the first connection port 3 being aligned with the valve 25 of the wheel. In FIG. 6, part of the housing 2 has been removed for illustrative purposes. As can be seen, the first valve 10 is in a closed state and hence the first connection port 3 is airtightly sealed by the plug 12 and the sealing ring 13. As can be seen, the special shape of the device 1 allows positioning the first connection port 3 in between the spokes 22 although the inflator assembly 40 has a relatively large pressurized volume. This becomes possible due to the special arrangement of the second connection ports 4 in combination with the relatively slim design of the device's 1 housing 2 in the region of the first connection port 3. In order to maximize the volumetric flow rates, which are necessary in order to inflate the tubeless tire 23, the valve core has previously been removed from the valve 25.

Figure 7:
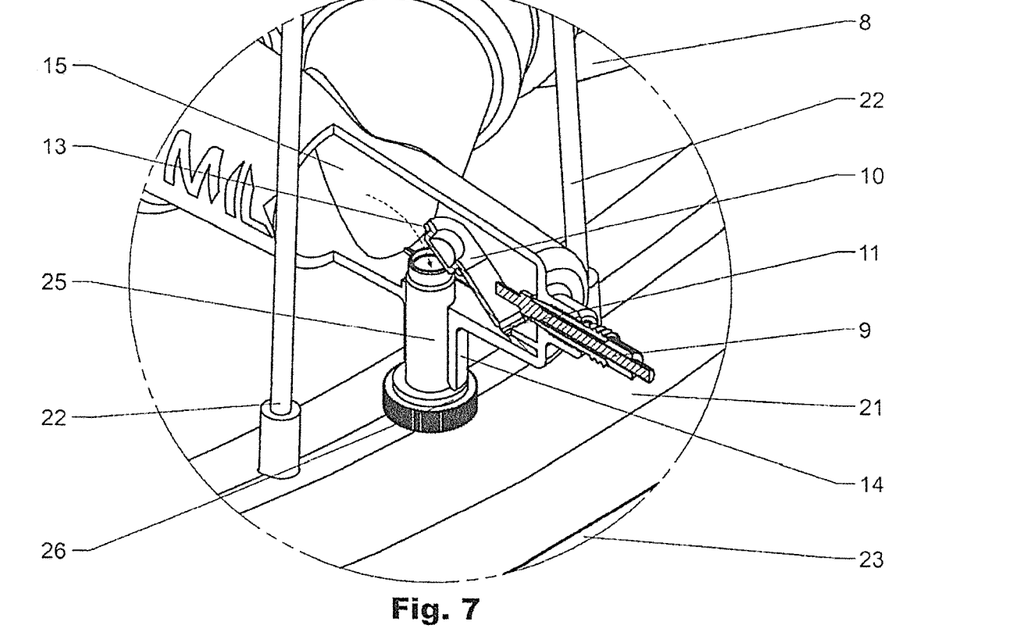
FIG. 7 schematically shows a device being connected to the valve of a wheel.

In order to induce inflation of the tire 23, the inflator assembly 40 can be lowered on the valve 25, respectively the valve 25 can be inserted in the sleeve 14 of the device 1, as shown in FIG. 7. As soon as the valve 25 is inserted to a certain extent, the valve 25 gets into contact with the plug 12 of the flap 10, pushes the plug 12 and subsequently causes the flap 10 to pivot about the film hinge 11. Hence the first valve 5 opens and the pressure gradient between the inner space of the inflator assembly 40 and the inner chamber 24 of the tire 23 (which at the beginning of inflation will essentially be equal to the atmospheric pressure) will cause transfer of gas from inside of the tanks 8 into the inner chamber 24 of the tire 23. In order to establish a proper sealing between the device 1 and the valve 25, the sleeve 14 of the first connection port 3 matches with the outer contour of the valve 25 of the wheel. Hence the gap between the sleeve 14 and the outer surface of the valve stem is relatively small in order to prevent drain of pressure between the sleeve and the outer surface of the valve stem. In addition, the length of the sleeve 14 is such that during the inflation process, the end face of the sleeve 14 aligns with a nut 26 that is used to fasten the valve 25 to the rim 21. Due to this alignment, drain of pressure between the sleeve 14 and the outer surface of the valve 25 is further reduced.

Figure 8:
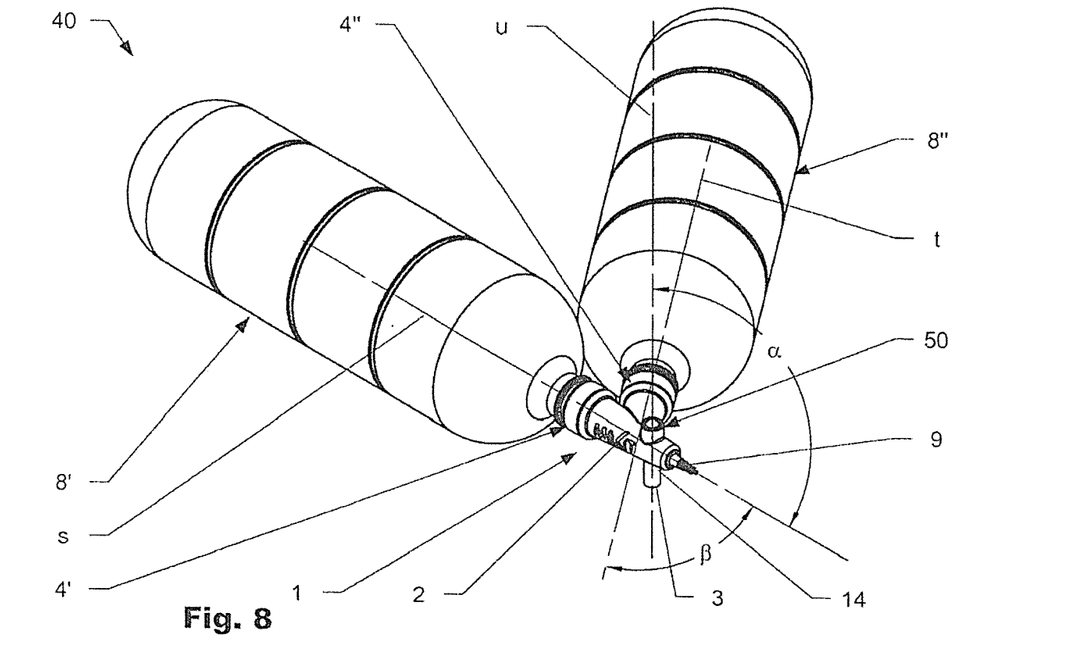
FIG. 8 schematically shows a further embodiment of an inflator assembly in a perspective view.

FIG. 8 shows a further embodiment of an inflator assembly 40 with a device 1 that has a forked shape similar to the shape of the device 1 shown in FIGS. 1 to 7. In the device 1 shown in FIG. 8, the housing 2, respectively the first and second connection ports 3, 4', 4", is/are arranged at specific angles α (alpha) and β (beta) with respect to each other, as subsequently further described in detail. A first pressure tank 8'—which in the shown embodiment is a drinking bottle—is interconnected by an outer thread (not shown) to a corresponding inner thread (not shown) of a first second connection port 4'. The first second connection port 4' (respectively the central axis of its inner thread) defines a first axis s. A second pressure tank 8"—which in the shown embodiment is also a drinking bottle—is interconnected by an outer thread (not shown) to a corresponding inner thread (not shown) of a second second connection port 4". The second second connection port 4" (respectively the central axis of its inner thread) defines a second axis t. The first connection port 3 is formed as a sleeve 14 with an axial opening that is arranged in order to receive the tire valve of a wheel, as will be shown with respect to FIGS. 12 and 13. The sleeve defines a third (center) axis u. Between the first axis s and the third axis u there is an angle α (alpha), which is about 120° (120 degrees of arc). It turned out that such an alignment of the first connection port 3 and first second connection port 4' allows a significantly improved handling (respectively operation) of the inflation device 40 if compared to a device 1 with an angle of 90° (90 degrees of arc) between the first axis s and the third axis u. On the one and—in particular when grasping the inflator assembly at the first pressure tank 8'—alignment of the first connection port 3 with a tire valve (not shown) turns out to be significantly easier with a device 1 having such an angle α (alpha). On the other hand, a user can apply more controlled, as well as higher, pressure to the device 1 when it is interconnected with a valve. Thus, a more ergonomic operation position of the inflator assembly 40 can be obtained which also helps to establish particularly reliable interconnections to a tire valve. Depending on the type of the first and/or second pressure tank 8', 8", the first angle α (alpha) may be different from about 120° (120 degrees of arc). In particular, it may vary between about 100° (100 degrees of arc) and 170° (170 degrees of arc). Between the first axis s and the second axis t there is an angle β (beta), which is about 75° (75 degrees of arc). It turned out that such an alignment of the first second connection port 4' and the second second connection port 4" allows to obtain an arrangement of a first and a second pressure tank 8', 8' which offers very convenient handling of the inflator assembly 40 by holding each one of the two pressure tanks 8', 8" in one hand. It is clear that such an angular arrangement of the first and second connection ports 3, 4', 4" may also be used for the device as shown in FIGS. 1 to 7.

As well, the device 1 shown comprises a third valve 50, which serves inter alia as a safety pressure relief valve.

Figure 9:
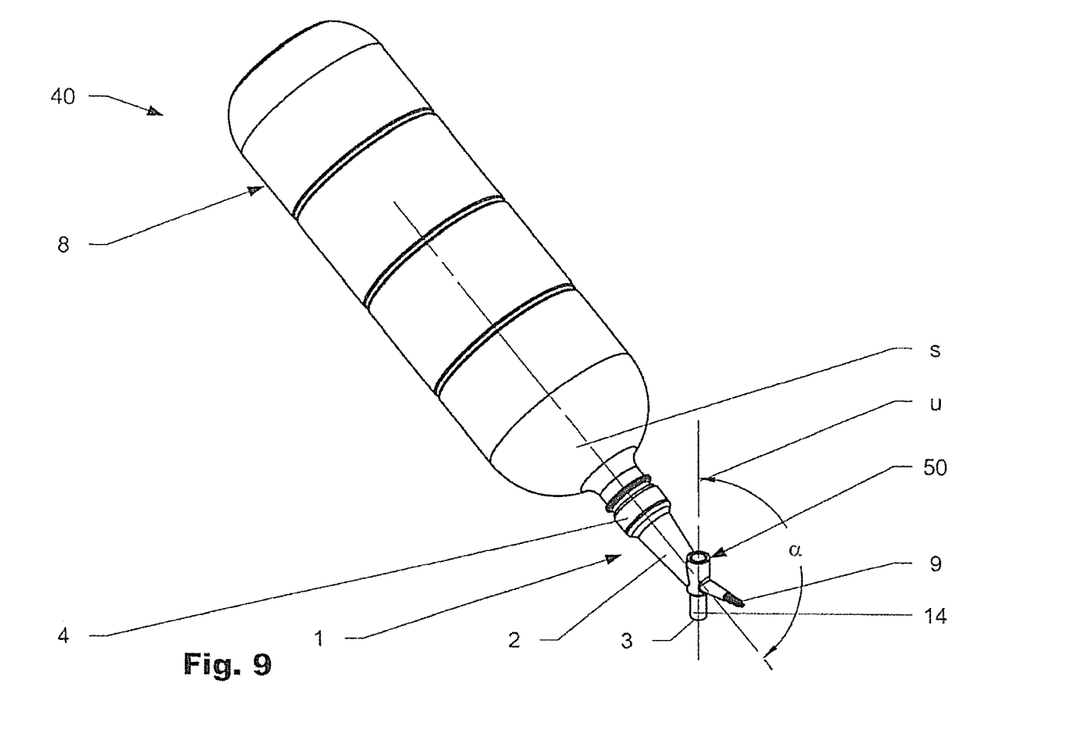
FIG. 9 schematically shows a further embodiment of an inflator assembly in a perspective view.

FIG. 9 shows another inflator assembly 40 that comprises a single pressure tank 8—which in the displayed embodiment is a drinking bottle—that is interconnected by an outer thread (not shown) to a corresponding inner thread (not shown) of a second connection port 4. The second connection port 4 (respectively the central axis of its inner thread) defines a first axis s. Like in FIG. 8, the first connection port 3 defines a third axis u. Between the first axis s and the second axis u there is an angle α (alpha) which is about 140° (140 degrees of arc) in order to allow highly ergonomic handling of the inflator assembly 40. Depending on the type of pressure tank 8, the first angle α (alpha) may be different from about 140° (140 degrees of arc). In particular, it may vary between about 100° (100 degrees of arc) and 170° (170 degrees of arc). It is clear that such an alignment of the first and the second connection ports 3, 4 is not limited to the embodiment shown in FIG. 9 and hence may also be used for other devices 1 according to the invention.

Figure 10:
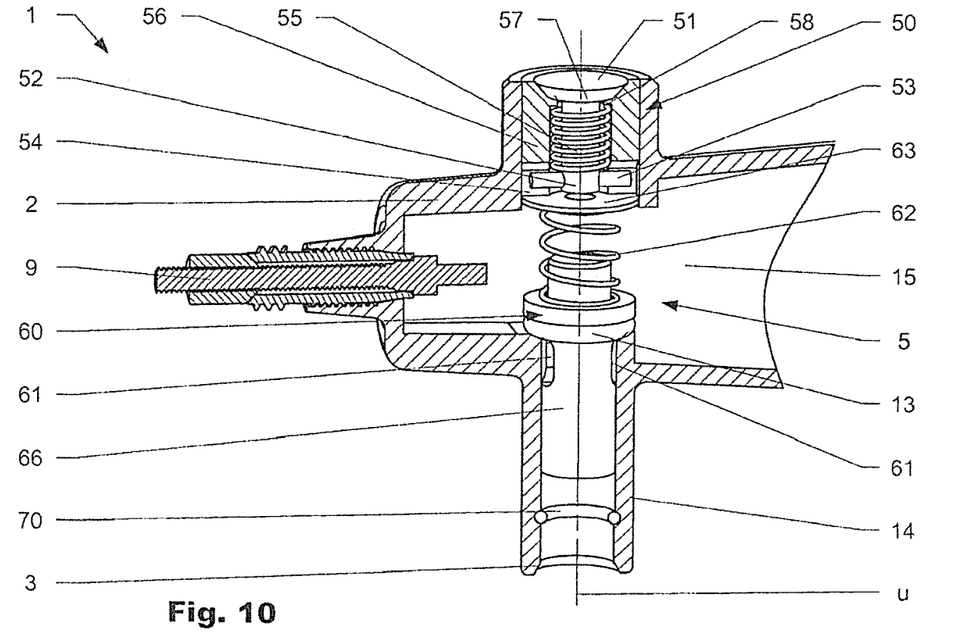
FIG. 10 schematically shows a portion of the device for inflating a tire of FIG. 8 in another perspective view, the housing of the device as well as the valve body partially being clipped for illustrative purposes.
Figure 11:
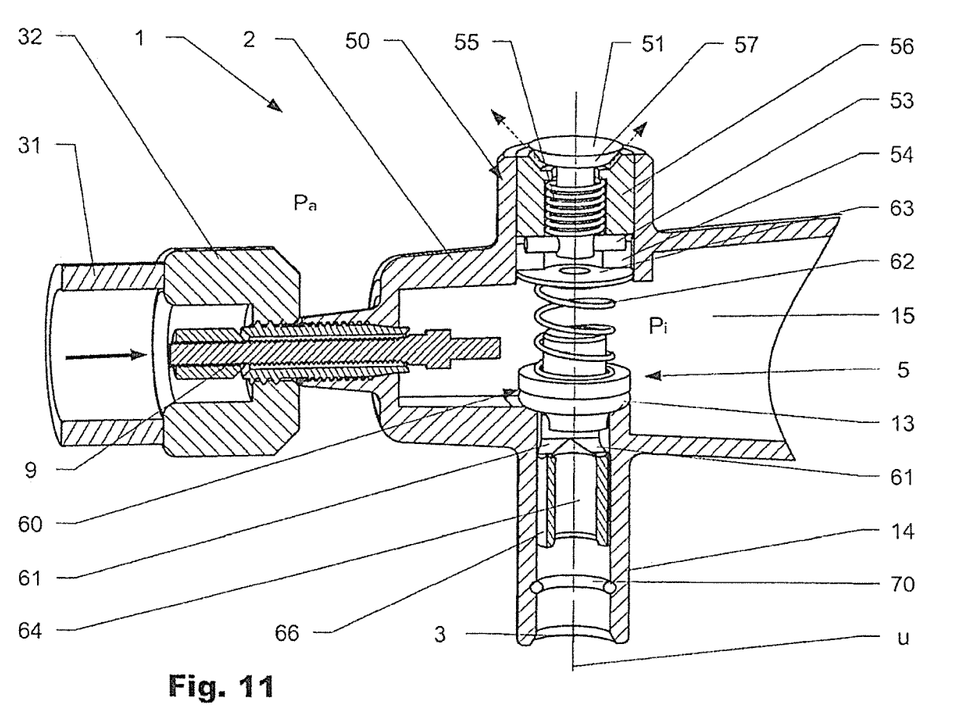
FIG. 11 schematically shows the device according to FIG. 10 being interconnected to a hose and connector.

FIG. 10 and FIG. 11 schematically illustrate the design and mode of operation of the third valve 50, which inter alia serves as a safety pressure relief valve and is arranged in the device 1. As shown, the third valve 50 is essentially arranged in the axial projection of the first connection port 3, respectively the sleeve 14. Such an embodiment allows easy manufacturing of the housing 2 by injection molding as well as convenient and/or automated assembly of the device 1 as components of a first valve 5 and third valve 50 may be mounted at the same time via the same opening in the housing 2. The third valve 50 comprises a bushing 56, which is arranged in an opening of the housing 2 of the device 1. The bushing 56 is mechanically interconnected with the opening, e.g. by gluing, interference fit or positive locking. Inside of the bushing 56 a plug 51 having a shaft 52 is arranged, such that it can be moved in axial direction (u-direction) of the bushing 56. In a first position (closed position) as shown in FIG. 10, a sealing face 57 of a conical, respectively frustum, part of the plug 51 is in contact with a corresponding face arranged at the bushing 56, fluidically separating inside (respectively the fluid passage 15) and outside of the device 1. The third valve 50 further comprises a pin 53 arranged in the shaft 52 and—the third valve 50 being in an assembled state—arranged in a nut 54 arranged in the bushing 56. On the shaft 52, a helical valve spring 55 is arranged, constrained between the pin 53 and a shoulder 58 arranged at the bushing 56 and pre-tensioned to a specific value.

As schematically shown, a sealing element 70 may be arranged inside of the sleeve 14, forming an annular restriction inside of the sleeve 14 and thus allowing particularly reliable sealing between a tire valve and the sleeve 14 when the tire valve is arranged in the sleeve 14, as will subsequently be shown in more detail. However, such a sealing element 70 is neither mandatory to the invention nor limited to the embodiment of a device as shown in FIG. 10.

FIG. 11 schematically illustrates pressurized air/gas (indicated by the continuous arrow) being filled into the device 1 by means of a hose 31. As soon as certain critical pressure difference between the pressure Pi inside of the device 1 and the atmospheric pressure Pa outside of the device 1 is obtained, a trigger force (defined by the geometry of the plug 51, the bushing 56 as well as the pre-tensioning and spring rate of the valve spring 55) acts on the plug 51 and shaft 52, leading to a displacement of the plug 51 from the first (closed) position to a second (open) position, where the inside of the device 1 is fluidically interconnected with the outside and hence pressurized gas can escape from inside to outside of the device 1, leading to a drop in the pressure difference. Hence, such a third valve 50 may on the one hand be used as a safety pressure relief valve in order to prevent critical pressure differences that may cause structural damage to an inflator assembly. On the other hand such a third valve 50 may be used in order to indicate a when an inflator assembly is sufficiently pressurized in order to be connected to a tire valve, hence serve as a simple pressure gauge.

Figure 12:
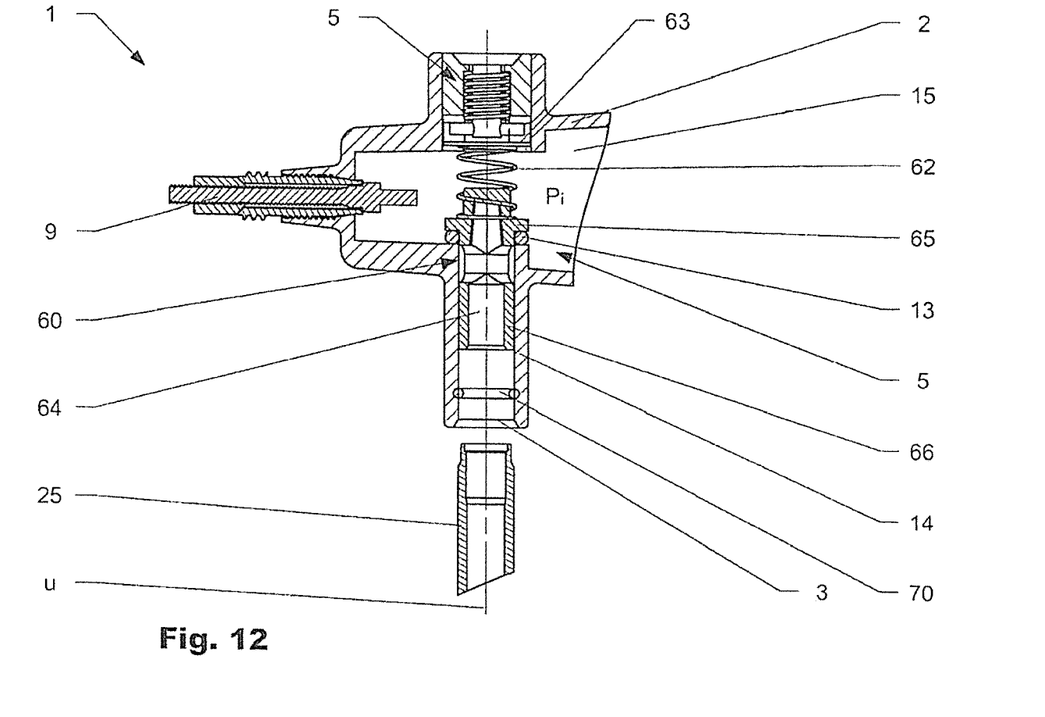
FIG. 12 schematically shows the device of FIG. 10 in a lateral view prior to being interconnected with a tire valve.
Figure 13:
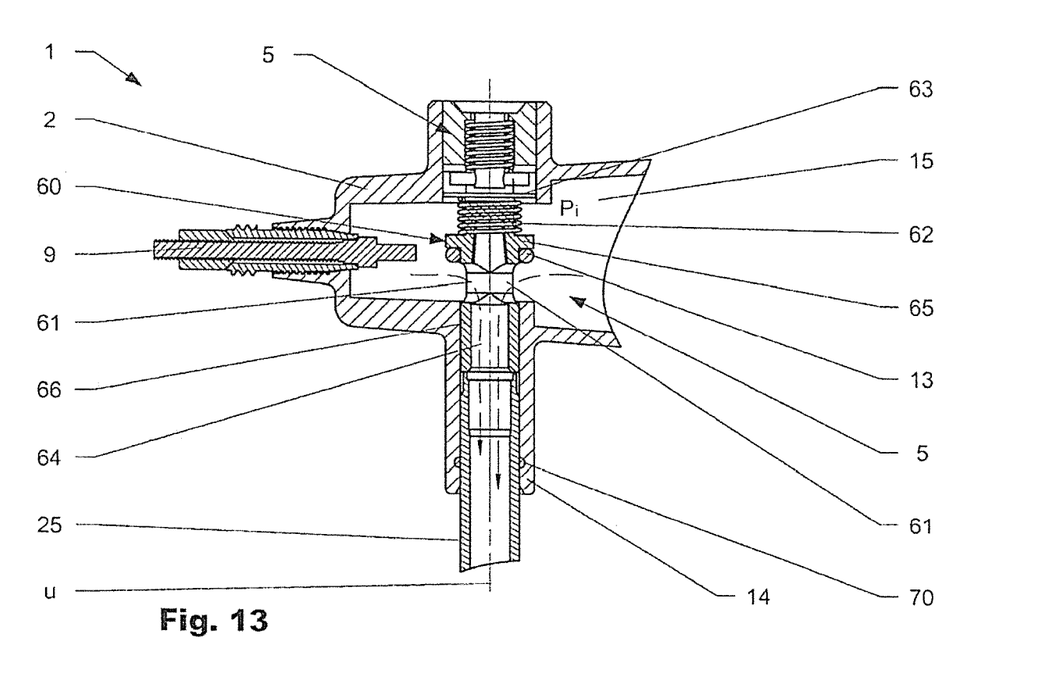
FIG. 13 schematically shows the device of FIG. 12 when being interconnected with a tire valve.

FIGS. 12 and 13 schematically illustrate a further embodiment of a first valve 5. The first valve 5 comprises a valve body 60, which has an elongated member 66 that is cylindrically shaped and has a center opening 64 formed as blind hole. The elongated member 66 further comprises in its wall/shell two radial orifices 60 that are fluidically interconnected with the center opening 64, respectively protrude the center opening 64. The valve body further comprises a peripheral protrusion that acts as a sealing member 65. In a first (closed) state, as shown in FIG. 12, the elongated member 66 is arranged inside of the sleeve 14 of the first connection port 3 and closes the first connection port 3 in a sealing manner by pressing a sealing ring 13 which is arranged on the elongated member 66 to the housing 2 by means of the sealing member 65. In order to provide proper sealing a pre-tensioned return spring 62 is arranged between the sealing member 65 of the valve body 60 and an abutment 63 arranged at a certain distance from the sealing member 65.

In order to release pressurized air from inside of the device 1, a tire valve 25 can be inserted into the sleeve 14, as illustrated in FIG. 13. As soon as the tire valve 25 gets into contact with the elongated member 66 of the valve body 60, the valve body 60 can be displaced relatively to the housing 2 (respectively sleeve 14) into a second (open) state, where pressurized gas can flow via the two orifices 61 and the center opening 64 to the tire valve 25 in order to inflate a tire connected thereto. As indicated, the sealing element 70 prevents airflow between the outer surface of the tire valve 25 and the inner surface of the sleeve 14.

What is claimed is:

1. An inflator assembly (40) for inflating a tire (23), comprising:
   a. a housing (2), said housing (2) comprising
      i. at least one first connection port (3),
      ii. at least one second connection port (4, 4', 4"), each of said at least one second connection port (4, 4', 4") comprising connecting means (6) to interconnect the inflator assembly (40) with a pressure tank (8, 8', 8"),
      iii. the at least one first connection port (3) being fluidically connected to the at least one second connection port (4, 4', 4") by a fluid passage (15);
   b. a first valve (5);
   c. when at least one pressure tank (8, 8', 8") is connected, respectively, to at least one respective second connection port (4, 4', 4"),
      i. the first valve (5) in a closed state is suited to prevent air from flowing from inside of the at least one pressure tank (8, 8', 8") out of the at least one first connection port (3), and
      ii. the first valve (5) in an open state is suited to allow passage of air from inside of the at least one pressure tank (8, 8', 8") through the fluid passage (15) to the at least one first connection port (3); and
   d. a second valve (9) that is connectable to an inflator (30) and can be used in order to pressurize the at least one pressure tank (8, 8', 8"), when the at least one pressure tank (8, 8', 8") is connected to the inflator assembly (40), with air,
   e. the first valve (5) is a two-way valve (5) that is arranged in the inflator assembly (40) to close or open a fluidical connection through the at least one first connection port (3),
   f. the second valve (9) is a two-way valve (5) that is arranged in the inflator assembly (40) to close or open a fluidical connection through at least one third connection port, and g. wherein the first valve (5) can close or open a fluidical connection through the inflator assembly (40) between the at least one pressure tank (8, 8', 8"), when connected to its respective second connection port (4, 4', 4"), and an inner chamber (24) of a tire (23), when connected to one first connection port (3), and can cause transfer of gas from inside of the at least one pressure tank (8, 8', 8") into the inner chamber (24) of the tire (23) when the second valve (9) is closed, h. wherein the second valve (9) can close or open a fluidical connection through the inflator assembly (40) between the inflator (30), when connected to the second valve (9), and the at least one pressure tank (8, 8', 8"), when connected to its respective second connection port (4, 4', 4"), and can cause transfer of gas from the inflator (30) to inside of the at least one pressure tank (8, 8', 8") when the first valve (5) is closed; and i. wherein the first valve (5) is a check valve, and wherein the at least one first connection port (3) comprises a sleeve (14) and wherein the check valve comprises a valve body (60) which includes an elongated member (66), the elongated member (66) being at least partially arranged inside of the sleeve (14) when the check valve is in the closed state, and wherein the valve body (60) comprises a sealing member (64) which in the closed state is in sealing contact with the housing (2) and thereby prevents air from flowing from inside of the at least one pressure tank (8, 8', 8") out of the at least one first connection port (3), wherein the elongated member (66) is arranged displaceable inside of the sleeve (14) in a first axial direction of the sleeve (14) such that when a valve (25) of a tire to be inflated is interconnected with the at least one first connection port (3) the elongated member is displaced in the first axial direction and thereby moves the sealing member (64) away from the housing (2) allowing passage of air from inside of the at least one pressure tank (8, 8', 8") through the fluid passage (15) to the at least one first connection port (3).

2. The inflator assembly (40) according to claim 1, wherein the first valve (5) and the second valve (9) function as valves that close the at least one pressure tank (8, 8', 8") when being connected to the inflator assembly (40); or the inflator assembly (40) does not comprise a three-way valve; or the inflator assembly (40) does not comprise any valve arranged at the second connection port (4, 4', 4").

3. The inflator assembly (40) according to claim 1, wherein
a. when the second valve (9) is connected to the inflator (30) and the at least one pressure tank (8, 8', 8") is connected to the at least one second connection port (4, 4', 4"), the second valve (9) is the sole valve arranged between the inflator (30) and the at least one pressure tank (8, 8', 8") that can close or open a fluidical connection therebetween; or
b. when the second valve (9) is connected to the inflator (30) and the tire (25) is connected to the at least one first connection port (3), the second valve (9) is arranged in series with the first valve (5) between the inflator (30) and the tire (23).

4. The inflator assembly (40) according to claim 1, wherein
the second valve (9) is mounted on the at least one third connection port of the inflator assembly (40) such that
a. a fluidical connection is provided through the inflator assembly (40) to the at least one second connection port (4, 4', 4") without any further valve besides the second valve (9) being present between the at least one third connection port and the at least one second connection port (4, 4', 4"); or
b. a fluidical connection is provided through the inflator assembly (40) to the at least one first connection port (3) by the second valve (9) being arranged in series with the first valve (5) between the at least one third connection port and the at least one first connection port (3).

5. The inflator assembly (40) according to claim 1, wherein the inflator assembly (40) comprises exactly one first connection port (3) and the first valve (5) is arranged at the first connection port (3); or the inflator assembly (40) comprises exactly one second connection port (4, 4', 4"); or the inflator assembly (40) comprises exactly one third connection port.

6. The inflator assembly (40) according to claim 1, wherein the elongated member (66) is formed as a tube or cylinder having a peripheral wall and comprising at least one center opening (64), and comprising at least one orifice (61) that protrudes the tube wall in radial direction.

7. The inflator assembly (40) according to claim 1, wherein the first valve (5) comprises a return spring (62) that applies a force on the valve body (60) such that when no valve (25) is interconnected with the exactly one first connection port (3) that sealing member (65) is pressed against the housing (2) with a certain force.

8. The inflator assembly (40) according to claim 1, wherein the at least one first connection port (3) is formed such that it can be connected directly to a tire valve (25), or the inflator assembly (40) is configured such that an adapter is used to establish a connection between the inflator assembly (40) and a tire valve (25); or the second valve (9) is a standardized tire valve.

9. The inflator assembly (40) according to claim 1, wherein the second valve (9) comprises a pressure relief valve, which limits the pressure that can be applied to the at least one pressure tank (8, 8', 8").

10. The inflator assembly (40) according to claim 1, wherein the inflator assembly (40) or at least a part of its housing (2) essentially has an elongated shape, wherein the elongated shape comprises the shape of an elongated cylinder or elongated pyramid or elongated cube or elongated frustum or elongated cone, suitable for positioning the inflator assembly (40) in between or close to spokes of a wheel.

11. The inflator assembly (40) according to claim 1, the inflator assembly (40) having a compact design with dimensions comparable to or smaller than a hand of a grown-up person.

12. The inflator assembly (40) according to claim 1, the inflator assembly (40) being used as a closure of a portable pressure tank (8, 8', 8"), wherein the portable pressure tank (8, 8', 8") comprises a plastic drinking bottle (8, 8', 8"), wherein the first valve (5) and the second valve (9) are closeable for sealing the at least one pressure tank (8, 8', 8") during transportation.

13. The inflator assembly (40) according to claim 1, wherein a cross section of the fluid passage (15) essentially remains constant between the at least one second connection port (4, 4', 4") and a region at the at least one first connection port (3); or the housing (2) and/or fluid passage (15) include a narrowing geometry.

14. The inflator assembly (40) according to claim 1, wherein the inflator assembly (40) is shaped like the letter "Y", two second connecting ports (4, 4', 4") being arranged at tips a respective tip of each arm of the "Y" and the at least one first connection port being arranged at a stem of the "Y".

15. The inflator assembly (40) according to claim 1, wherein the inflator assembly (40) comprises a third valve (50) arranged such that the third valve (50) releases pressurized air from inside of the at least one pressure tank (8, 8', 8") interconnected to the inflator assembly (40), if the pressure difference between inside of the at least one pressure tank (8, 8', 8") and outside exceeds a specific value, which is chosen such that a tire (23) interconnected with the device (1) can be properly inflated.

16. The inflator assembly (40) according to claim 1, wherein the inflator assembly (40) comprises a third valve (50) arranged such that the third valve (50) serves as a pressure gauge, which indicates when the inflator assembly (40), comprising a device (1) and the at least one pressure tank (8, 8', 8") connected to the at least one second connection port (4, 4', 4"), is sufficiently pressurized for being connected to a tire valve (25).

17. The inflator assembly (40) according to claim 1, wherein the at least one pressure tank (8, 8', 8") is a multi-purpose pressure tank (8, 8', 8"), wherein the multi-purpose pressure tank (8, 8', 8") comprises a plastic bottle (8, 8', 8") or a plastic drinking bottle (8, 8', 8"); or the at least one pressure tank (8, 8', 8") is made from a highly elastic material, such as a rubber balloon or a balloon made from a similar resilient material, or is an inner tube of a tire.

18. The inflator assembly (40) according to claim 1, wherein the connecting means (6) arranged at the at least one second connection port (4, 4', 4") comprises is a thread (6); and wherein the thread (6) engages with a mating thread arranged at the at least one pressure tank (8, 8', 8") to be interconnected with the inflator assembly (40).

19. The inflator assembly (40) according to claim 18, wherein the thread (6) is suited to engage with an outer thread of a plastic bottle, wherein the plastic bottle comprises a plastic drinking bottle (8, 8', 8") used as the at least one pressure tank (8, 8', 8"); or
wherein a cross sectional area of the fluid passage (15) essentially aligns with a cross sectional area of the bottleneck of the plastic drinking bottle (8, 8', 8") which is used as the at least one pressure tank (8, 8', 8").

20. An inflator assembly (40) for inflating a tire (23), comprising:
a. a housing (2), said housing (2) comprising
  i. at least one first connection port (3),
  ii. at least one second connection port (4, 4', 4"), each of said at least one second connection port (4, 4', 4") comprising connecting means (6) to interconnect the inflator assembly (40) with a pressure tank (8, 8', 8"),
  iii. the at least one first connection port (3) being fluidically connected to the at least one second connection port (4, 4', 4") by a fluid passage (15);
b. a first valve (5);
c. when at least one pressure tank (8, 8', 8") is connected, respectively, to at least one respective second connection port (4, 4', 4"),
  the first valve (5) in a closed state is suited to prevent air from flowing from inside of the at least one pressure tank (8, 8', 8") out of the at least one first connection port (3), and
  ii. the first valve (5) in an open state is suited to allow passage of air from inside of the at least one pressure tank (8, 8', 8") through the fluid passage (15) to the at least one first connection port (3); and
d. a second valve (9) that is connectable to an inflator (30) and can be used in order to pressurize the at least one pressure tank (8, 8', 8"), when the at least one pressure tank (8, 8', 8") is connected to the inflator assembly (40), with air,
e. the first valve (5) is a two-way valve (5) that is arranged in the inflator assembly (40) to close or open a fluidical connection through the at least one first connection port (3),
f. the second valve (9) is a two-way valve (5) that is arranged in the inflator assembly (40) to close or open a fluidical connection through at least one third connection port, and
g. wherein the first valve (5) can close or open a fluidical connection through the inflator assembly (40) between the at least one pressure tank (8, 8', 8"), when connected to its respective second connection port (4, 4', 4"), and an inner chamber (24) of a tire (23), when connected to one first connection port (3), and can cause transfer of gas from inside of the at least one pressure tank (8, 8', 8") into the inner chamber (24) of the tire (23) when the second valve (9) is closed,
h. wherein the second valve (9) can close or open a fluidical connection through the inflator assembly (40) between the inflator (30), when connected to the second valve (9), and the at least one pressure tank (8, 8', 8"), when connected to its respective second connection port (4, 4', 4"), and can cause transfer of gas from the inflator (30) to inside of the at least one pressure tank (8, 8', 8") when the first valve (5) is closed; and
i. wherein the inflator assembly (40) comprises a third valve (50) arranged such that the third valve (50) releases pressurized air from inside of the at least one pressure tank (8, 8', 8") interconnected to the inflator assembly (40), if the pressure difference between inside of the at least one pressure tank (8, 8', 8") and outside exceeds a specific value, which is chosen such that a tire (23) interconnected with the inflator assembly (40) can be properly inflated.

21. An inflator assembly (40) for inflating a tire (23), comprising:
a. a housing (2), said housing (2) comprising
  i. at least one first connection port (3),
  ii. at least one second connection port (4, 4', 4"), each of said at least one second connection port (4, 4', 4") comprising connecting means (6) to interconnect the inflator assembly (40) with a pressure tank (8, 8', 8"),
  iii. the at least one first connection port (3) being fluidically connected to the at least one second connection port (4, 4', 4") by a fluid passage (15);
b. a first valve (5);
c. when at least one pressure tank (8, 8', 8") is connected, respectively, to at least one respective second connection port (4, 4', 4"),
  i. the first valve (5) in a closed state is suited to prevent air from flowing from inside of the at least one pressure tank (8, 8', 8") out of the at least one first connection port (3), and
  ii. the first valve (5) in an open state is suited to allow passage of air from inside of the at least one pressure tank (8, 8', 8") through the fluid passage (15) to the at least one first connection port (3); and
d. a second valve (9) that is connectable to an inflator (30) and can be used in order to pressurize the at least one pressure tank (8, 8', 8"), when the at least one pressure tank (8, 8', 8") is connected to the inflator assembly (40), with air, e. the first valve (5) is a two-way valve (5) that is arranged in the inflator assembly (40) to close or open a fluidical connection through the at least one first connection port (3),
f. the second valve (9) is a two-way valve (5) that is arranged in the inflator assembly (40) to close or open a fluidical connection through at least one third connection port, and
g. wherein the first valve (5) can close or open a fluidical connection through the inflator assembly (40) between the at least one pressure tank (8, 8', 8"), when connected to its respective second connection port (4, 4', 4"), and an inner chamber (24) of a tire (23), when connected to one first connection port (3), and can cause transfer of gas from inside of the at least one pressure tank (8, 8', 8") into the inner chamber (24) of the tire (23) when the second valve (9) is closed,
h. wherein the second valve (9) can close or open a fluidical connection through the inflator assembly (40) between the inflator (30), when connected to the second valve (9), and the at least one pressure tank (8, 8', 8"), when connected to its respective second connection port (4, 4', 4"), and can cause transfer of gas from the inflator (30) to inside of the at least one pressure tank (8, 8', 8") when the first valve (5) is closed; and
i. wherein the inflator assembly (40) comprises a third valve (50) arranged such that the third valve (50) serves as a pressure gauge, which indicates when the inflator assembly (40), comprising a device (1) and the at least one pressure tank (8, 8', 8") connected to the at least one second connection port (4, 4', 4"), is sufficiently pressurized for being connected to a tire valve (25).

* * * * *